April 30, 1935.  E. G. JAQUES  1,999,239
COLLAPSIBLE SAW GUIDE
Filed May 22, 1934  2 Sheets-Sheet 1
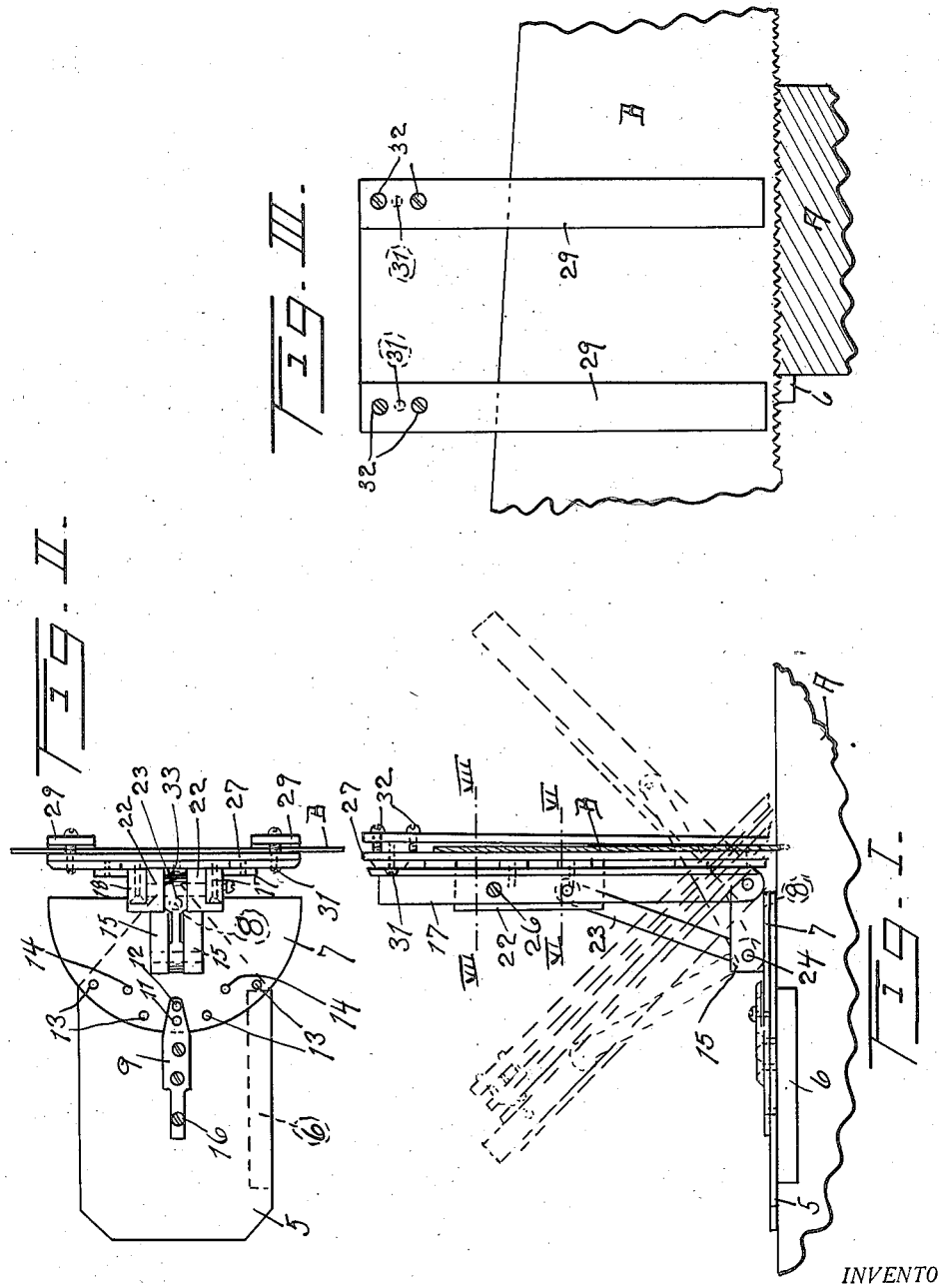
INVENTOR.
ERNEST G. JAQUES.
BY
ATTORNEY.

April 30, 1935. E. G. JAQUES 1,999,239
COLLAPSIBLE SAW GUIDE
Filed May 22, 1934 2 Sheets-Sheet 2
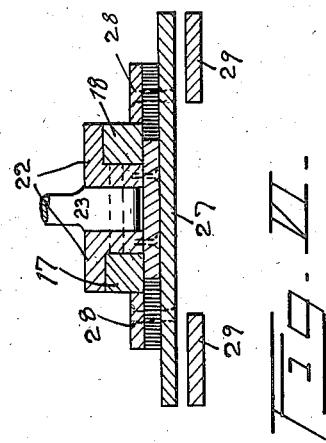
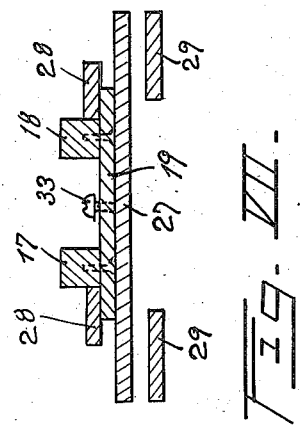
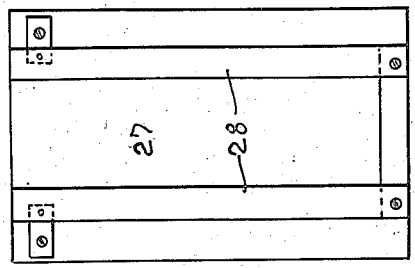
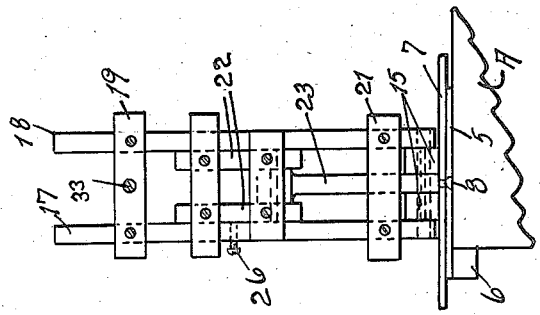
INVENTOR.
ERNEST G. JAQUES.
BY
ATTORNEY.

Patented Apr. 30, 1935

1,999,239

UNITED STATES PATENT OFFICE 1,999,239

COLLAPSIBLE SAW GUIDE

Ernest G. Jaques, San Francisco, Calif.

Application May 22, 1934, Serial No. 726,930

1 Claim. (Cl. 143—88)

This invention relates to improvements in a collapsible saw guide.

The principal object of the invention is to produce a device which will direct the cut of a saw in any desired direction, and a device which may be readily collapsed so as to fit in the pocket and yet a device which is rigid in construction when in use.

A further object is to produce a device which will accommodate saws of various thicknesses.

Another object is to produce a device wherein the guiding edge will always be in close proximity to the line of cut.

An additional object is to produce a device which is economical to manufacture and one which is easily adjusted to the various angles of the cut.

A still further object is to produce a device wherein a protractor may be used therewith so as to determine a definite angle if desired.

Other objects and advantages will be apparent during the course of the following description.

In the accompanying drawings forming a part of this specification and in which like numerals are employed to designate like parts throughout the same, Fig. I is a side elevation of my device and showing in full dotted lines one position to which the guide may be moved and in dotted outline another position, Fig. II is a top plan view of Fig. I, Fig. III is an end elevation of Fig. I, Fig. IV is an end elevation with the guide plate removed, Fig. V is the rear view of the guide plate, Fig. VI is an enlarged detail cross sectional view on the line 6—6 of Fig. I, and Fig. VII is an enlarged cross sectional view on the line 7—7 of Fig. I.

The ordinary saw guide or miter is usually a large bulky device, expensive to manufacture and therefore out of the range of the average user. Applicant, therefore, has devised a simple arrangement whereby a saw may be guided at any desired angle to the vertical or may be pivoted so that the horizontal cut will also be at an angle.

In the accompanying drawings wherein for the purpose of illustration is shown a preferred embodiment of my invention, the numeral 5 designates a base plate having a block 6 attached to one side thereof. This block serves to position my device parallel with the edge of the material to be sawed which is shown at A. Pivoted to the plate 5 is a segment 7 pivoted as at 8. A retainer 9 has its point overlying the segment 7 and provided with a pair of openings 11 and 12. The opening 11 will coincide with openings 13 formed upon the segment 7 and the opening 12 will coincide with openings 14 formed in the segment. A screw 16 normally held in the retainer may be inserted in either of the holes 11 or 12 when it is desired to lock the segment in adjusted position. The outer row of holes 13 will form a square cut, while the inner row 14 will form a hexagonal cut. Mounted upon the segment 7 is a pair of blocks 15 which serve to pivot parallel pieces 17 and 18 (see Figs. II and IV). Cross pieces 19 and 21 are secured thereto and have their ends extending beyond the outer side margins of the parallel pieces 17 and 18, the purpose of which will be later seen. Slidable on the parallel pieces are blocks 22 which are pivoted to a link 23 which in turn is pivoted as at 24 to the blocks 15. A set screw 26 extends through one of the parallel pieces and abuts one of the sliding blocks 22 and serves as a lock to adjust the sliding blocks at any desired position. Slidably mounted upon the cross pieces 19 and 21 is a guide plate 27. This guide plate has mounted upon its rear surface a pair of strips 28 which are spaced therefrom so as to permit the ends of the cross pieces 19 and 21 to extend between the guide plate and the strips 28, (see Fig. VII).

Referring now to Fig. III, it will be noted that the front of the plate has a pair of guide fingers 29 which are attached to the upper portion of the plate by screws 31 (see Figs. I and II). Adjusting screws 32 are carried by the fingers and by proper manipulation of these screws the lower end of the fingers may be adjusted toward or away from the bottom of the plate 27. This adjustment permits saws of various thicknesses to be used with my device. A set screw 33 (see Fig. VII) carried in the cross pieces 19 may be adjusted so as to bear against the plate 27 and lock it in adjusted position with relation to the parallel pieces.

By referring now to Fig. I, if the saw, which is designated at B, is held in a vertical position as here shown, the segment 7 may be rotated upon its pivoted point so as to form any desired cross cut and at any angle. By now tipping the device as indicated in full dotted lines of Fig. I it will be apparent that as the plate 27 moves about the pivot point of the parallel members 17 and 18, the bottom of the plate 27 will naturally draw away from the work. Therefore, if the proper angle is first made, then the plate may be slid upon the parallel members until its lower edge is in close proximity to the cutting line. In the outline dotted position of Fig. I the converse will be true, that is, when the parallel members are swung toward the right of the drawings the lower end of the plate 27 will contact the work and therefore the plate must be slid upwardly on the parallel members so as to permit further swinging action. Through the use of the set screws 16, 26 and 33 any of the above positions of the device may be locked so as to retain the saw in proper alignment.

It will thus be seen that when the device is in use, it will perform all the functions above set forth and by swinging the parallel members to a position parallel with the base plate 5, that all of the parts will occupy a minimum amount of room and in this collapsed position the entire device may be readily placed in the pocket for easy transportation.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a base plate, a block secured to said base plate and capable of engaging an object to be cut, a segment pivotally connected to said base plate, a pair of spaced blocks carried by said segment, parallel spaced members pivoted to said blocks, a pair of cross pieces connected to said parallel members, said cross pieces having their ends extending beyond the outside edges of said parallel margins, a second pair of blocks movable between said parallel members and slidably held thereagainst, a link pivotally connected to said sliding blocks and to said blocks on said segment, a guide plate slidably mounted on the ends of said cross pieces, said plate having its lower extremity in close proximity to the work to be sawed irrespective of the angular position of said plate with respect to said base plate, and spaced guide fingers secured to said guide plate, said fingers extending to a point adjacent the lower extremity of said guide plate.

ERNEST G. JAQUES.